(12) United States Patent
Aulwurm et al.

(10) Patent No.: US 11,980,887 B2
(45) Date of Patent: May 14, 2024

(54) EXTRACTION CELL FOR EXTRACTING A SAMPLE

(71) Applicant: LCTech GmbH, Obertaufkirchen (DE)

(72) Inventors: Uwe Aulwurm, Velden/Vils (DE); Martin Brandlhuber, St. Wolfgang (DE)

(73) Assignee: LCTech GmbH, Obertaufkirchen (DE)

( * ) Notice: Subject to any disclaimer, the term of this patent is extended or adjusted under 35 U.S.C. 154(b) by 304 days.

(21) Appl. No.: 17/213,595

(22) Filed: Mar. 26, 2021

(65) Prior Publication Data

US 2021/0346884 A1 Nov. 11, 2021

(30) Foreign Application Priority Data

May 5, 2020 (EP) .................................. 20172899

(51) Int. Cl.
*B01L 3/00* (2006.01)
*C09J 9/00* (2006.01)

(52) U.S. Cl.
CPC ........... *B01L 3/50825* (2013.01); *B01L 3/565* (2013.01); *B01L 2200/0689* (2013.01);
(Continued)

(58) Field of Classification Search
CPC ................. B01L 3/50825; B01L 3/565; B01L 2200/0689; B01L 2300/041; B01L 2300/0681; B01L 2300/0832; B01L 3/563; B01L 2200/026; B01L 2200/0631; C09J 9/00; G01N 2001/4061; G01N 1/4055; B01D 11/0219; B01D 11/0203; B01J 3/03
(Continued)

(56) References Cited

U.S. PATENT DOCUMENTS 4,045,291 A * 8/1977 Berger .................. C12M 45/22
435/297.5
7,101,477 B1 * 9/2006 Willis ................ G01N 30/6026
210/656
(Continued)

FOREIGN PATENT DOCUMENTS

EP 2918323 9/2015
WO 9627418 9/1996

*Primary Examiner* — Benjamin R Whatley
*Assistant Examiner* — Jacqueline Brazin
(74) *Attorney, Agent, or Firm* — Renner, Kenner, Greive, Bobak, Taylor & Weber

(57) ABSTRACT

The extraction cell according to the invention for extracting a sample is substantially characterized by the following features: a tubular extraction body having a first end and an opposite second end which has an interior space for receiving the sample, a first closure arrangement for sealingly closing the first end of the tubular extraction body, a second closure arrangement for sealingly closing the second end of the tubular extraction body, wherein the first closure arrangement has a first fluid port for supplying or discharging a fluid and the second closure arrangement has a second fluid port for supplying or discharging a fluid. Furthermore, between the extraction body and the first closure arrangement and between the extraction body and the second closure arrangement, at least one adhesive arrangement is provided for holding the first and the second closure arrangements on the extraction body.

11 Claims, 3 Drawing Sheets

Figure 1:
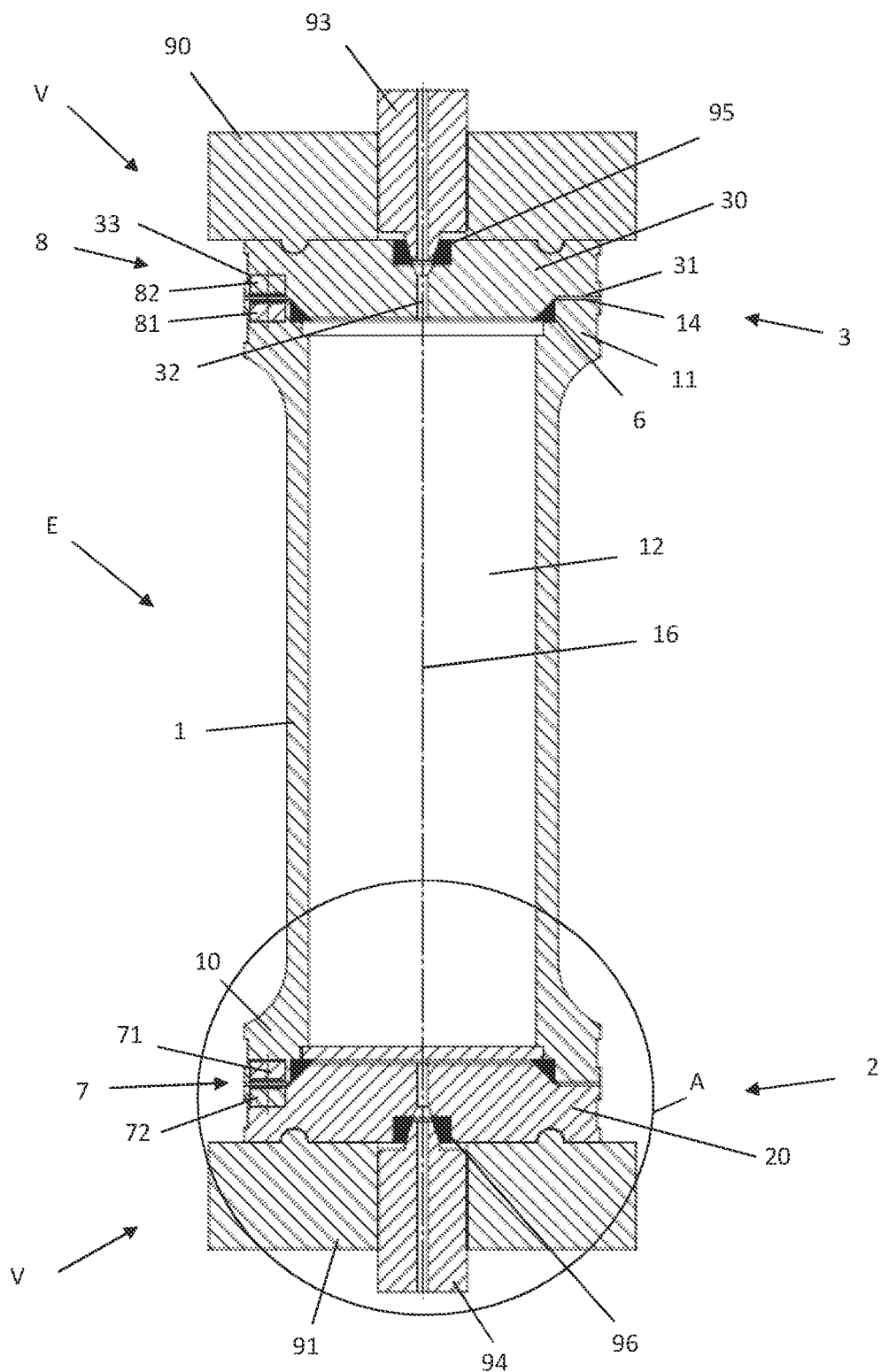

(52) U.S. Cl.
CPC . *B01L 2300/041* (2013.01); *B01L 2300/0681* (2013.01); *B01L 2300/0832* (2013.01); *C09J 9/00* (2013.01)

(58) Field of Classification Search
USPC .......................................................... 422/550
See application file for complete search history.

(56) References Cited

U.S. PATENT DOCUMENTS

| 2013/0193052 A1* | 8/2013 | Witt | B01D 15/206 |
| | | | 137/315.01 |
| 2018/0217096 A1* | 8/2018 | Baran | G01N 27/48 |
| 2018/0361386 A1* | 12/2018 | Hjelseth | B01L 3/561 |

\* cited by examiner

EXTRACTION CELL FOR EXTRACTING A SAMPLE

The invention relates to an extraction cell for extracting a sample.

With the help of extraction cells, corresponding analytes, such as pesticides, PCB, PAH, dioxins, and other components, are usually extracted from a sample material to be examined with the help of solvents, which are then usually fed to an analysis system after further cleaning.

Extraction cells normally consist of a tubular extraction body having a first end and an opposite second end, which ends are closed by closure arrangements so that an interior space for receiving a sample is obtained. The solvent or another suitable fluid is supplied or discharged via the closure arrangements. The extraction bodies are usually closed by means of closure arrangements which are screwed to the extraction body, as disclosed, for example, in EP 2 918 323 A1 or WO 96/27418 A1.

However, screw connections have the disadvantage that more or less manual effort is required for assembly or disassembly. Furthermore, an automated attachment or removal of the closure arrangements is complex or difficult to implement. Accordingly, an automatic emptying of the extracted residual sample including filters is difficult to carry out. In addition, these known extraction cells often require an increased cleaning effort due to the number and complexity of the components.

The invention is therefore based on the object of specifying an extraction cell for extracting a sample which is characterized by rapid assembly or rapid disassembly.

According to the invention, this object is achieved by the features of claim 1.

The extraction cell according to the invention for extracting a sample is substantially characterized by the following features:
- a tubular extraction body having a first end and an opposite second end which has an interior space for receiving the sample,
- a first closure arrangement for sealingly closing the first end of the tubular extraction body,
- a second closure arrangement for sealingly closing the second end of the tubular extraction body, wherein the first closure arrangement has a first fluid port for supplying or discharging a fluid and the second closure arrangement has a second fluid port for supplying or discharging a fluid.

Furthermore, between the extraction body and the first closure arrangement and between the extraction body and the second closure arrangement, at least one adhesive arrangement is provided for holding the first and the second closure arrangements on the extraction body.

The adhesive arrangement results in the advantage that the closure arrangement does not have to be screwed on, but only has to be attached or removed. As a result, only a linear movement of the closure arrangement along the longitudinal center axis of the extraction body is required when the closure arrangement is attached or removed. Such a movement can also be carried out in an automated and simple manner. In the case of a thread, the closure body cannot be lifted off with a linear movement since the thread blocks this direction of movement.

Another advantage of the adhesive arrangement according to the invention over a screw connection is that the holding force with which the closure arrangement is held on the extraction body can be adjusted in a targeted manner. By appropriately selecting the adhesive arrangement, the holding force, for example of a permanent magnet, can be matched to the requirements (weight of the closure arrangement, weight of the sample, number of adhesive elements used . . . ), in order to ensure, on the one hand, a secure hold of the closure arrangement on the extraction body and, on the other hand, to be able to lift off the closure arrangement without applying unnecessary force.

The preferred embodiment of the invention consists in that the at least one adhesive arrangement is designed as a permanent-magnetic adhesive arrangement. Permanent magnets, in particular neodymium, samarium, cobalt, or ferrite magnets can be used in this case. In principle, however, it would also be conceivable within the scope of the invention to use Velcro fasteners or a silicone-based fastener instead of the permanent-magnetic adhesive arrangement. The adhesive arrangement can have one or more adhesive elements which are designed to be annular. However, an embodiment is preferred in which a plurality of first adhesive elements is provided at the ends of the extraction body in each case, which first adhesive elements are distributed over the circumference and interact with a corresponding number of second adhesive elements on the two closure arrangements. The adhesive arrangement must be designed in such a way that it is suitable for the intended temperature range of 200° C., for example. The adhesive arrangements allow for a rapid assembly or a rapid disassembly of the extraction cell. In addition, automated handling can also be easily implemented.

According to a further embodiment of the invention, the first closure arrangement and the second closure arrangement each have an outer closure body and an inner closure body, the inner closure body being displaceably guided on the outer closure body. Furthermore, a seal is preferably provided between the extraction body and the inner closure body, which can be compressed by the displacement of the inner closure body relative to the outer closure body for the purpose of a fluid-tight connection. This makes it possible for the closure arrangements to have a first closure position (pre-closure position), in which the outer closure body is held on the extraction body via the at least one adhesive arrangement and in which the inner closure body is not yet in a position which compresses the seal relative to the outer closure body. Furthermore, the closure arrangements provide a second closure position (fluid-tight closure position) in which the outer closure body is still held on the extraction body via the adhesive arrangements and the inner closure body is in a position which compresses the seal relative to the outer closure body.

The classic field of application of the extraction cell according to the invention is at temperatures up to 200° C. and pressures from 0 to 100 bar. A fluid-tight closure of the extraction body is of course not practicable at high pressures of up to 100 bar due to the adhesive arrangement. The closure arrangements therefore provide the above-described first and second closure positions, whereby, in the first closure position, the closure arrangement is held only on the extraction body, in order to transfer the extraction body closed in this way, in particular, into a clamping device in which the two inner closure bodies are clamped in such a way that they move relative to their outer closure bodies in the direction of the extraction cell and thereby compress the seals arranged therebetween, in order to establish the fluid-tight second closure position in this way.

An extraction fluid, usually a solvent, can then be added under increased pressure. In addition, the pressure of the extraction fluid can be by the accelerated As soon as the extraction cell is again removed from the bracing unit, it can be opened in a quick and simple manner by lifting off the closure arrangement. The assembly and opening processes of the extraction cells are therefore considerably simplified by the adhesive arrangement according to the invention and, moreover, can be easily automated. Furthermore, there is the possibility of automatically emptying the extraction cell into the waste after the closure arrangements have been removed, for example by a robot, whereby the seals and any frits can be designed as disposable components, but this is not absolutely necessary. The seal preferably consists of a suitable polymer, while the frit can consist of polymers or biopolymers or metal.

The adhesive arrangement has at least one first adhesive element and at least one second adhesive element interacting therewith in an adhesive manner, the at least one first adhesive element being attached to the ends of the extraction body and the at least one second adhesive element being attached to the closure arrangements. In this case, the extraction cell can each have a flange at the first end and at the second end which, in the first closure position and in the second closure position, are in holding operative contact with the outer closure body of the associated closure arrangement. The first and the second adhesive arrangements can each have at least one first adhesive element and at least one second adhesive element interacting therewith in an adhesive manner, the at least one first adhesive element being attached to the flange of the extraction body and the at least one second adhesive element being attached to the outer closure body. In a further embodiment, the first adhesive elements can be provided in recesses in the flange of the extraction body and the second adhesive elements can be provided in recesses in the outer closure body.

The first and the second adhesive elements can be fastened in the associated recesses, for example, by pressing, shrink fit, screwing, or gluing. In order to ensure that the closure arrangements are held on the extraction body as reliably as possible, a plurality of first adhesive elements is provided at the ends of the extraction body in each case, which first adhesive elements are distributed over the circumference and interact with a corresponding number of second adhesive elements on the two closure arrangements.

In addition, the first fluid port is arranged on the inner closure body of the first closure arrangement and the second fluid port is arranged on the inner closure body of the second closure arrangement, so that the fluid-tight seal between the interior of the extraction body and the two fluid ports is ensured by the displacement of the interior space of the closure body and the resulting compression of the seal.

By using an adhesive arrangement to hold the closure body on the extraction body, it is possible to move the closure arrangement linearly in the direction of the longitudinal center axis of the extraction body between a raised open position and a first closure position (pre-closure position), the closure arrangement being held on the extraction body in the first closure position by means of the adhesive arrangement. In this way, a relatively simple automated opening or closing of the extraction body can be carried out.

In many applications, a frit is provided as the filter, which is preferably held between the at least one first closure arrangement and the extraction body. For this purpose, the frit can in particular be held in a recess in the extraction body. The seal between the inner closure body and the frit can then be provided particularly advantageously. In a practical embodiment, the insertion of the frit into the recess of the extraction body leaves an annular gap, the seal compressed by the inner closure body expediently pressing both onto the extraction body and onto the frit in the region of the gap. The seal is thus arranged approximately centrally over the gap and thus, on the one hand, produces the fluid-tight seal toward the outside and, at the same time, secures the frit in the recess of the extraction body.

Further configurations of the invention are explained in more detail with reference to the following description of two embodiments.

Figure 2:
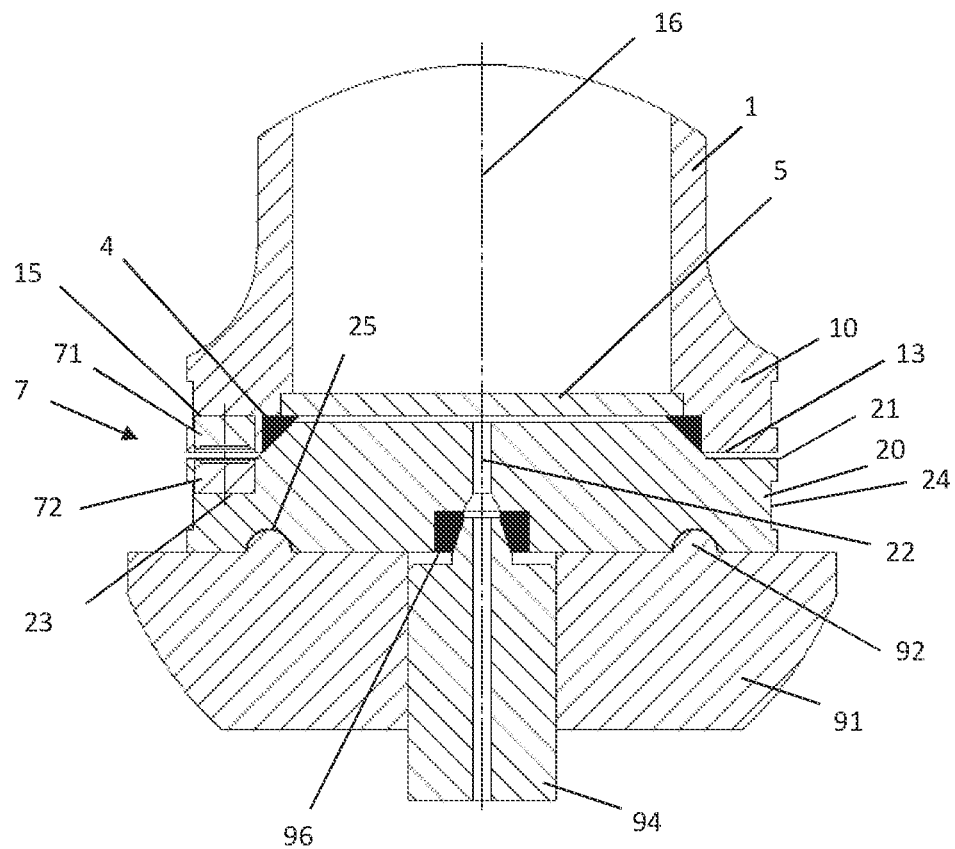
Figure 3:
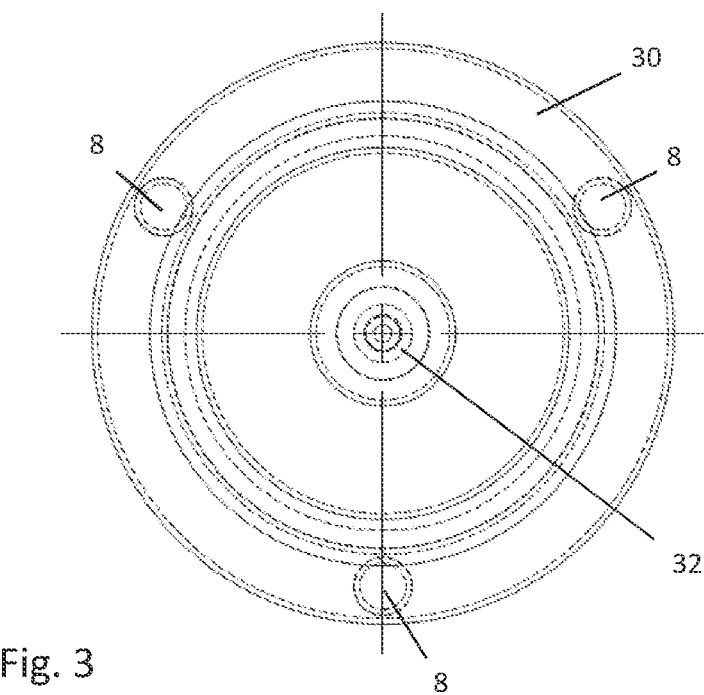
Figure 4:
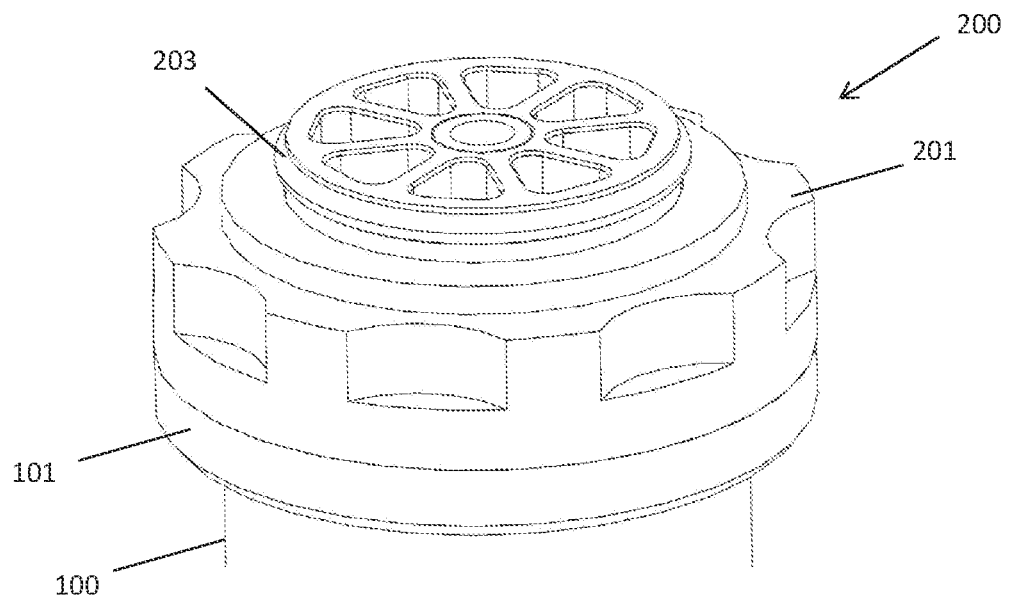
Figure 5:
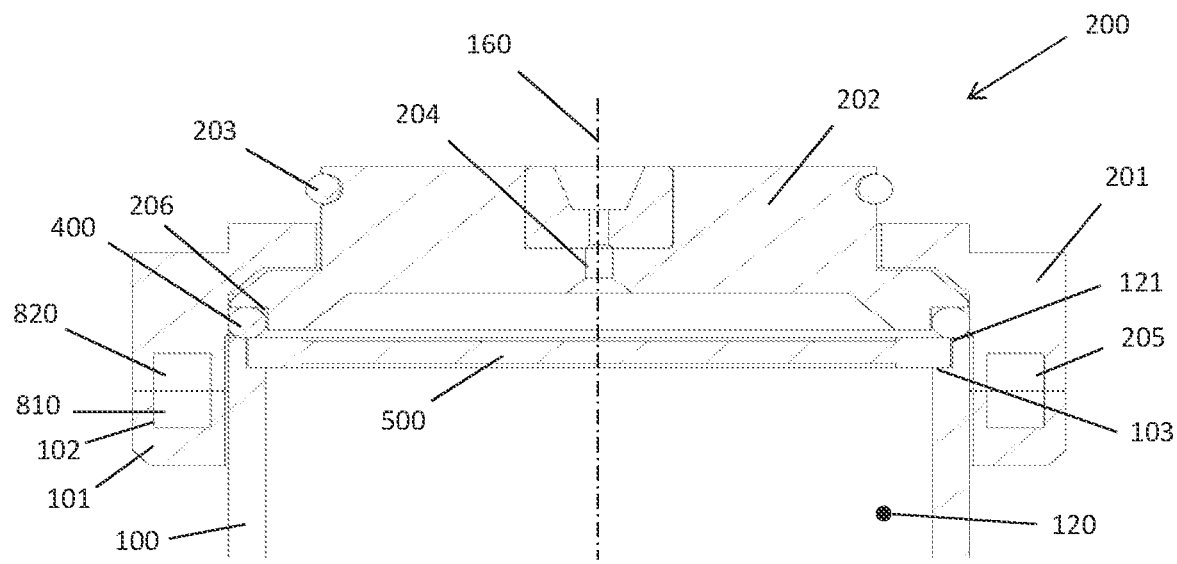

In the drawings:

FIG. 1 is a sectional view of an extraction cell according to the invention in the clamped state, FIG. 2 is an enlarged sectional view of the detail A of FIG. 1, FIG. 3 is a top view of the extraction cell according to FIG. 1, FIG. 4 is a three-dimensional representation of a closure arrangement according to a second embodiment, and FIG. 5 is a sectional view of the closure arrangement according to FIG. 4.

The extraction cell E shown in FIG. 1 is clamped in a bracing unit V and has an extraction body 1 for receiving a sample (not shown in more detail), which is sealingly closed with a first closure arrangement 2 and a second closure arrangement 3. The extraction body 1 is tubular, the lower, first end 10 thereof being closed with the first closure arrangement 2 and the upper, second end 11 thereof being closed with the second closure arrangement. The extraction body also has an interior space 12 for receiving the sample.

The first closure arrangement 2 is shown enlarged in FIG. 2 and has a first closure body 20, which in turn provides a circumferential flange 21 which interacts with a first end face 13 of the extraction body 1 and sealingly closes this extraction body at the lower, first end 10 thereof by means of a first seal 4. The first closure body 20 also has a centrally arranged, first fluid port 22 via which a fluid, for example a solvent, can be supplied or discharged. Furthermore, a frit 5 is provided between the extraction body 1 and the first closure body 20, which frit can be a porous plate made, for example, of polymers or metal. On the one hand, the frit 5 is intended to hold back the mostly powdery sample, while a fluid supplied at the upper end of the extraction body can be discharged through the frit 5 and the first fluid port 22. The porosity of the frit is, for example, 1 to 50 µm, depending on the application. The sample to be examined, however, has a correspondingly larger particle size. The second closure arrangement 3 at the upper, second end 11 of the extraction body 1 is constructed identically and accordingly has a second closure body 30 with a second fluid port 32. Furthermore, the second closure body 30 has a second flange 31 which interacts with a second end face 14 of the extraction body 1 and with a second seal 6.

To ensure that the two closure bodies 20, 30 do not accidentally fall off when the extraction cell E is inserted into the bracing unit V, the closure bodies in the prior art are usually screwed to the extraction body. In the embodiment according to the invention, however, between the extraction body 1 and the first closure arrangement 2 and between the extraction body 1 and the second closure arrangement 3, at least one adhesive arrangement 7 or 8 is provided for holding the first and the second closure arrangements 2, 3 on the extraction body 1. The two adhesive arrangements 7, 8 each have first adhesive elements 71 and 81 and second adhesive elements 72 and 82 interacting therewith in an adhesive manner, the first adhesive element 71 and 81 being attached in each case to the ends of the extraction body 1 and the respective second adhesive element 72 or 82 being attached in each case to the closure arrangements 2 and 3.

For this purpose, the first end face and the second end face 13, 14 of the extraction body 1 have first recesses 15 for receiving the first adhesive elements 71 and 81, respectively. In a corresponding manner, second recesses 23 and 33 are provided in the first flange 21 and in the second flange 31, in which the second adhesive elements 72 and 82 are inserted. The first adhesive element and the second adhesive element can be held in the associated recesses in particular by means of pressing, shrink fit, screwing, or gluing. From FIG. 3, it can be seen that in the illustrated embodiment, three first and second adhesive arrangements 7, 8 are arranged so as to be distributed evenly over the circumference.

According to a preferred embodiment of the invention, the adhesive arrangements are formed by permanent-magnetic adhesive arrangements, so that simply placing the first or the second closure body 20, 30 on the associated first or second end face 13, 14 of the extraction body 1 is sufficient to hold it in place. The adhesive force must be sufficiently large so that the closure bodies 20, 30, in particular the closure body 20 located at the lower end of the extraction body 1, cannot unintentionally loosen due to its own weight and the weight of the sample located in the interior space 12. Rather, a sufficiently large, additional force must be required to lift the respective closure body. The closure body can be lifted off in particular as an extension of the longitudinal center axis 16 of the extraction body 1, i.e. by a linear movement.

In order to allow automated removal of the first or the second closure body 20, 30, it is advantageous if the two closure bodies 20, 30 have a notch 24 on their outer circumferential surface, with which a secure gripping of a robot is ensured.

The bracing unit V, which is part of an extraction system, has an upper clamping jaw 90 and a lower clamping jaw 91, between which the extraction cell E is clamped (FIG. 1). To ensure that a simple centering of the extraction cell can be effected in the bracing unit V, the two closure bodies 20, 30 can each have annular beads 25 which interact with correspondingly complementary bulges 92.

By applying pressure to the clamping jaws 90 and 91, the first and the second closure bodies 20, 30 are pressed onto the extraction body 1, so that the first and second seals 4, 6 provide a fluid-tight and pressure-tight closure that allows for applications at up to 100 bar and more. It can be provided that the lower clamping jaw 91 is arranged in a stationary manner and only the upper clamping jaw 90 is designed to be movable in the direction of the longitudinal center axis 16. The two clamping jaws 90, 91 also have a fluid supply line 93 and a fluid discharge line 94 which can be moved along the longitudinal center axis 16 and which can be connected to the first fluid port 22 and the second fluid port 32 in a fluid-tight manner by means of seals 95 and 96, respectively. In specific applications, it is also conceivable that at least part of the fluid can be supplied and discharged via the fluid discharge line 94.

The extraction process with the extraction system described above is as follows:

First, the extraction body 1 is closed at the lower end thereof with the first closure arrangement 2, the first seal 4, and the frit in order to introduce the sample to be examined via the upper end which is still open, the sample usually filling about a third to half of the interior space. The second closure arrangement 3 having the second seal is then attached and the extraction cell assembled in this way is inserted into the bracing unit V. The upper and lower clamping jaws 90, 91 are brought together with the required pressure relative to one another in order to close the extraction body in a pressure-tight manner. Furthermore, the fluid supply line 93 and the fluid discharge line 94 are connected. The provided fluid, for example a solvent, is then supplied via the fluid supply line 93, optionally under pressure, and heated to a predetermined temperature for accelerated extraction by means of a heating device (not shown in detail) whereby a pressure of up to 100 bar can be established. For safety reasons, pressures above this value can be released via a pressure relief valve (not shown in detail). After the extraction and after the pressure falls below a critical safety pressure, a valve opens in connection with the fluid discharge line 94 and the extraction solution is discharged via the fluid discharge line 94. The frit 5 inserted at the lower end of the extraction body holds back the sample and only allows the supplied fluid to pass together with the extracted analytes. The discharged fluid is then subjected to further processing and/or analysis.

Instead of the static method described above, the extraction cell can also be used in a dynamic method in which the extraction fluid flows continuously through the extraction cell.

Depending on the application, it is also possible to use a suitable heating device to heat the extraction body to up to 200° C. and more.

To remove and empty the extraction cell E, the upper clamping jaw is moved apart relative to the lower clamping jaw 91, so that the extraction cell E can be removed manually or by machine using a robot. The two closure arrangements 2, 3 can be lifted off in a simple manner, with only the force of attraction of the adhesive arrangements having to be overcome. This can therefore also be done, in particular, automatically. The sample is then emptied into the waste, the frit 5 and the seals 4, 6 possibly being retained for reuse.

FIGS. 4 and 5 show a closure arrangement 200 according to a second embodiment, which can be used as an alternative to the first or the second closure arrangement 2, 3. It is characterized by an outer closure body 201 and an inner closure body 202, the inner closure body 202 being guided displaceably in the outer closure body 201. To ensure that the two closure bodies 201, 202 are held together, on the one hand, the outer closure body 201 encompasses the inner closure body 202 and, on the other hand, a spring ring 203 or some other securing means is provided.

The extraction body 100 has a flange 101 in each case at the first end and at the second end which comes into operative contact with the outer closure bodies 201 when closing the extraction body 100. For this purpose, first adhesive elements 810 are arranged in recesses 102 in the flange 101, which interact with second adhesive elements 820 which are held in recesses 205 of the outer closure body 201.

FIG. 5 shows the closure arrangement 200 in a first closure position (pre-closure position) in which the outer closure body 201 is held on the flange 101 of the extraction body by means of the two adhesive elements 810, 820. A seal 400 is also provided between the extraction body 100 and the inner closure body 202, which seal, starting from the first closure position shown in FIG. 5, can be compressed by displacing the inner closure body 202 relative to the outer closure body 201, in order to thereby establish a fluid-tight connection between the interior space 120 of the extraction body 100 and the fluid port 204 provided centrally on the inner closure body 202.

In the illustrated embodiment, a frit 500 is held in a recess 103 at one end of the extraction body 100. Between the frit 500 and the extraction body 100 there is an annular gap 121 in the recess 103, which is covered by the seal 400 arranged centrally above the gap 121, so that the seal 400 presses in the compressed state both onto the extraction body 100 and onto the frit 500. The seal 400 is accommodated in a circumferential groove 206 which is open radially outward and in the direction of the extraction body 100. The outer closure body 201 engages around the inner closure body 202 so that the latter can be linearly displaced to a limited extent in the direction of the longitudinal center axis 160, for example by exerting external pressure by the bracing device V shown in FIG. 1. To ensure that the inner closure body 202 does not slip out of the outer closure body 201 when the closure arrangement 200 is lifted off the extraction body 100, the inner closure body 202 is secured via the spring ring 203. The adjustment path of the inner closure body 202 with respect to the outer closure body 201 is dimensioned such that the seal 400 can be compressed to a sufficient extent in order to produce the desired pressure-tight closure.

Since a pressure-tight closure of the extraction body for applications of pressures of up to 100 bar cannot be brought about by the adhesive arrangements alone, the closure arrangements of the two embodiments shown in FIGS. 1 to 5 are designed such that the adhesive arrangements only serve to hold the closure body in the pre-closure position on the extraction body, which ensures filling with a sample and transfer to the bracing unit V. The actual pressure-tight closure is only ensured in the bracing unit V in that the two opposing closure bodies are braced relative to one another.

Since the interacting adhesive elements are not responsible for the fluid-tight closure, their adhesive force can be made correspondingly lower, so that only a relatively small installation space is required for this purpose. Compared to the threaded screw connections previously used, the adhesive arrangements have the great advantage that only a linear direction of movement is required for lifting off and attaching the closure body, which of course does not preclude a short rotational movement which takes place for easier loosening of the closure body.

The invention claimed is:

1. An extraction cell (E) for extracting a sample comprising
   a tubular extraction body (1, 100) having a first end and an opposite second end which has an interior space (12, 120) for receiving the sample,
   a first closure arrangement (2, 200) for sealingly closing the first end of the tubular extraction body (1, 100),
   a second closure arrangement (3, 200) for sealingly closing the second end of the tubular extraction body (1, 100), wherein
   the first closure arrangement (2, 200) has a first fluid port (22, 204) for supplying or discharging a fluid and the second closure arrangement (3, 200) has a second fluid port (32, 204) for supplying or discharging a fluid, wherein
between the extraction body (1, 100) and the first closure arrangement (2, 200) and between the extraction body (1, 100) and the second closure arrangement (2, 200) there is provided in each case at least one holding arrangement (7, 8) selected from the group consisting of a permanent-magnetic arrangement, a hook-and-loop fastener, and a silicone-based closure for holding the first and second closure arrangements (2, 3, 200) on the extraction body (1, 100), wherein
the first closure arrangement and the second closure arrangement (200) each have:
   an outer closure body (201) and an inner closure body (202), the inner closure body (202) being displaceably guided on the outer closure body (201),
   a seal (400) provided between the extraction body (100) and the inner closure body (202) such that the seal can be compressed by the displacement of the inner closure body (202) relative to the outer closure body (201) for the purpose of a fluid-tight connection,
   a first closure position, in which the outer closure body (201) is held on the extraction body (100) via the at least one holding arrangement (7, 8) and the inner closure body (202) is in a position which does not compress the seal (400) relative to the outer closure body (201), and
   a second closure position, in which the outer closure body (201) is held on the extraction body (100) via the at least one holding arrangement (7, 8) and the inner closure body (202) is in a position which compresses the seal (400) relative to the outer closure body (201).

2. The extraction cell according to claim 1, wherein the at least one holding arrangement has at least one first securing element (81, 810) and at least one second securing element (82, 820) interacting to secure the first closure arrangement and the second closure arrangement in the first position, the at least one first securing element (81, 810) being attached to the ends of the extraction body (1, 100) and the at least one second securing element (82, 820) being attached to the closure arrangements (2, 3, 200).

3. An extraction cell (E) for extracting a sample comprising
   a tubular extraction body (1, 100) having a first end and an opposite second end which has an interior space (12, 120) for receiving the sample,
   a first closure arrangement (2, 200) for sealingly closing the first end of the tubular extraction body (1, 100),
   a second closure arrangement (3, 200) for sealingly closing the second end of the tubular extraction body (1, 100), wherein
   the first closure arrangement (2, 200) has a first fluid port (22, 204) for supplying or discharging a fluid and the second closure arrangement (3, 200) has a second fluid port (32, 204) for supplying or discharging a fluid, wherein
between the extraction body (1, 100) and the first closure arrangement (2, 200), there is provided a first holding arrangement, and, between the extraction body (1, 100) and the second closure arrangement (2, 200), there is provided a second holding arrangement (7, 8) selected from the group consisting of a permanent-magnetic arrangement, a hook-and-loop fastener, and a silicone-based closure for holding the first and second closure arrangements (2, 3, 200) on the extraction body (1, 100)
the first closure arrangement and the second closure arrangement (200) each have an outer closure body (201) and an inner closure body (202), the inner closure body (202) being displaceably guided on the outer closure body (201), and
   the extraction body (100) has a flange (101) in each case at the first end and at the second end which, in the closure position, is in holding operative contact with the outer closure body (201) of the associated closure arrangement, the first holding arrangement and the second holding arrangement each having at least one first securing element (810) and at least one second securing element (820) interacting to secure the first closure arrangement to the second closure arrangement in a first position, the at least one first securing element (810) being attached to the flange (101) of the extraction body (100) and the at least one second securing element (820) being attached to the outer closure body (201).

4. The extraction cell according to claim 3, wherein the first securing elements (810) are arranged in recesses (102) in the flange (101) of the extraction body (100) and the second securing elements (820) are arranged in recesses (205) of the outer closure body (201).

5. The extraction cell according to claim 4, wherein the first and the second securing elements (81, 810, 82, 820) are held in the associated recesses (15, 33, 102, 205) by means of pressing, shrink fit, screwing, or gluing.

6. An extraction cell (E) for extracting a sample comprising
a tubular extraction body (1, 100) having a first end and an opposite second end which has an interior space (12, 120) for receiving the sample,
a first closure arrangement (2, 200) for sealingly closing the first end of the tubular extraction body (1, 100),
a second closure arrangement (3, 200) for sealingly closing the second end of the tubular extraction body (1, 100), wherein
the first closure arrangement (2, 200) has a first fluid port (22, 204) for supplying or discharging a fluid and the second closure arrangement (3, 200) has a second fluid port (32, 204) for supplying or discharging a fluid,
between the extraction body (1, 100) and the first closure arrangement (2, 200) and between the extraction body (1, 100) and the second closure arrangement (2, 200) there is provided in each case a holding arrangement (7, 8) selected from the group consisting of a permanent-magnetic arrangement, a hook-and-loop fastener, and a silicone-based closure for holding the first and second closure arrangements (2, 3, 200) on the extraction body (1, 100), and
the holding arrangement includes a plurality of first securing elements (81, 810) distributed over a circumference at the ends of the extraction body (1, 100) in each case, which first securing elements interact with a corresponding number of second securing elements (82, 820) of the holding arrangement.

7. An extraction cell (E) for extracting a sample comprising
a tubular extraction body (1, 100) having a first end and an opposite second end which has an interior space (12, 120) for receiving the sample,
a first closure arrangement (2, 200) for sealingly closing the first end of the tubular extraction body (1, 100),
a second closure arrangement (3, 200) for sealingly closing the second end of the tubular extraction body (1, 100), wherein
the first closure arrangement (2, 200) has a first fluid port (22, 204) for supplying or discharging a fluid and the second closure arrangement (3, 200) has a second fluid port (32, 204) for supplying or discharging a fluid,
between the extraction body (1, 100) and the first closure arrangement (2, 200) and between the extraction body (1, 100) and the second closure arrangement (2, 200) there is provided in each case at least one holding arrangement (7, 8) selected from the group consisting of a permanent-magnetic arrangement, a hook-and-loop fastener, and a silicone-based closure for holding the first and second closure arrangements (2, 3, 200) on the extraction body (1, 100), and the extraction body (100) has a longitudinal center axis (160) and at least the first closure arrangements (200) have an outer closure body (201) and an inner closure body (202) connected thereto, the first closure arrangements (200) being linearly movable in the direction of the longitudinal center axis (160) between a raised open position and a first closure position, the closure arrangements being held on the extraction body in the first closure position by means of the at least one holding arrangement (7, 8).

8. The extraction cell according to claim 1, wherein a frit (500) is held between the at least one closure arrangement (200) and the extraction body (100).

9. An extraction cell (E) for extracting a sample comprising
a tubular extraction body (1, 100) having a first end and an opposite second end which has an interior space (12, 120) for receiving the sample,
a first closure arrangement (2, 200) for sealingly closing the first end of the tubular extraction body (1, 100),
a second closure arrangement (3, 200) for sealingly closing the second end of the tubular extraction body (1, 100), wherein
the first closure arrangement (2, 200) has a first fluid port (22, 204) for supplying or discharging a fluid and the second closure arrangement (3, 200) has a second fluid port (32, 204) for supplying or discharging a fluid,
between the extraction body (1, 100) and the first closure arrangement (2, 200) and between the extraction body (1, 100) and the second closure arrangement (2, 200) there is provided in each case at least one holding arrangement (7, 8) selected from the group consisting of a permanent-magnetic arrangement, a hook-and-loop fastener, and a silicone-based closure for holding the first and second closure arrangements (2, 3, 200) on the extraction body (1, 100),
a frit (500) is held between the at least one closure arrangement (200) and the extraction body (100), and the frit (5, 500) is held in a recess (103) in the extraction body (1, 100).

10. The extraction cell according to claim 1, wherein a frit (500) is held in a recess (103) at one end of the extraction body (100) and furthermore the seal (400) is provided between the inner closure body (202) and the frit (500).

11. The extraction cell according to claim 10, wherein there is an annular gap (121) between the frit (500) and the extraction body (100) and the seal (400) compressed by the inner closure body (202) in the region of the gap (121) presses onto the extraction body (100) as well as onto the frit (500).

* * * * *